United States Patent [19]

Gobien

[11] 4,196,847
[45] Apr. 8, 1980

[54] THERMOSTATIC CONTROL VALVE

[75] Inventor: Ernst Gobien, Weinstadt, Fed. Rep. of Germany

[73] Assignee: Daimler-Benz Aktiengesellschaft, Fed. Rep. of Germany

[21] Appl. No.: 968,903

[22] Filed: Dec. 13, 1978

[30] Foreign Application Priority Data

Dec. 13, 1977 [DE] Fed. Rep. of Germany ....... 2755466

[51] Int. Cl.$^2$ ................................................ F01P 7/02
[52] U.S. Cl. ................................ 236/34.5; 236/93 A; 236/100
[58] Field of Search ...................... 236/34, 34.5, 93 A, 236/100, 99 K, 99 J, 93 R; 165/40

[56] References Cited

U.S. PATENT DOCUMENTS

| | | | |
|---|---|---|---|
| 2,379,109 | 6/1945 | Shaw | 236/34.5 |
| 2,444,711 | 7/1948 | Shaw | 236/34.5 |
| 3,935,998 | 2/1976 | Caldwell | 236/99 K X |

Primary Examiner—William E. Wayner
Assistant Examiner—William E. Tapolcai, Jr.
Attorney, Agent, or Firm—Craig and Antonelli

[57] ABSTRACT

A thermostatic control valve for maintaining an essentially constant set value of an operating temperature of a liquid coolant which is conductible through a cooling jacket of an internal combustion engine. The thermostatic control valve includes a warm-up valve for suppressing a coolant flow at least in a partial area of the cooling jacket, a radiator valve for supplying coolant emerging from a coolant outlet of the cooling jacket to a radiator, and a bypass valve for returning the liquid coolant emerging from the cooling jacket bypassing the radiator to a coolant inlet of the cooling jacket. A single thermostatic regulating element, responsive to temperature changes and adapted to execute regulating movements is provided for actuating the radiator valve, bypass valve, and additionally actuating the warm-up valve.

17 Claims, 16 Drawing Figures

U.S. Patent   Apr. 8, 1980   Sheet 2 of 4   4,196,847
FIG 5
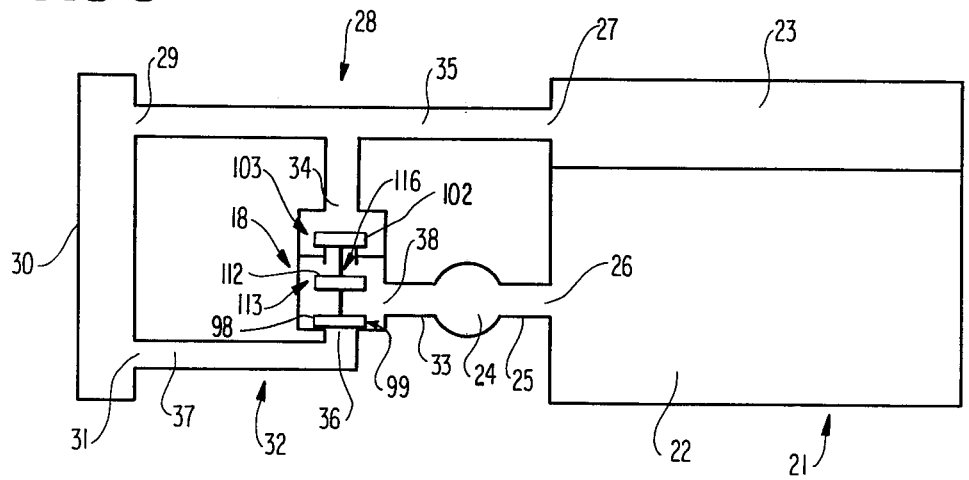
FIG 6
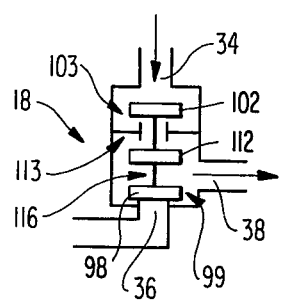
FIG 7
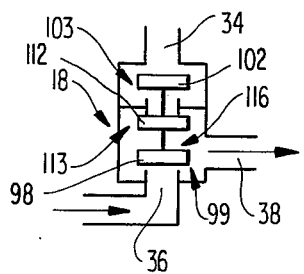
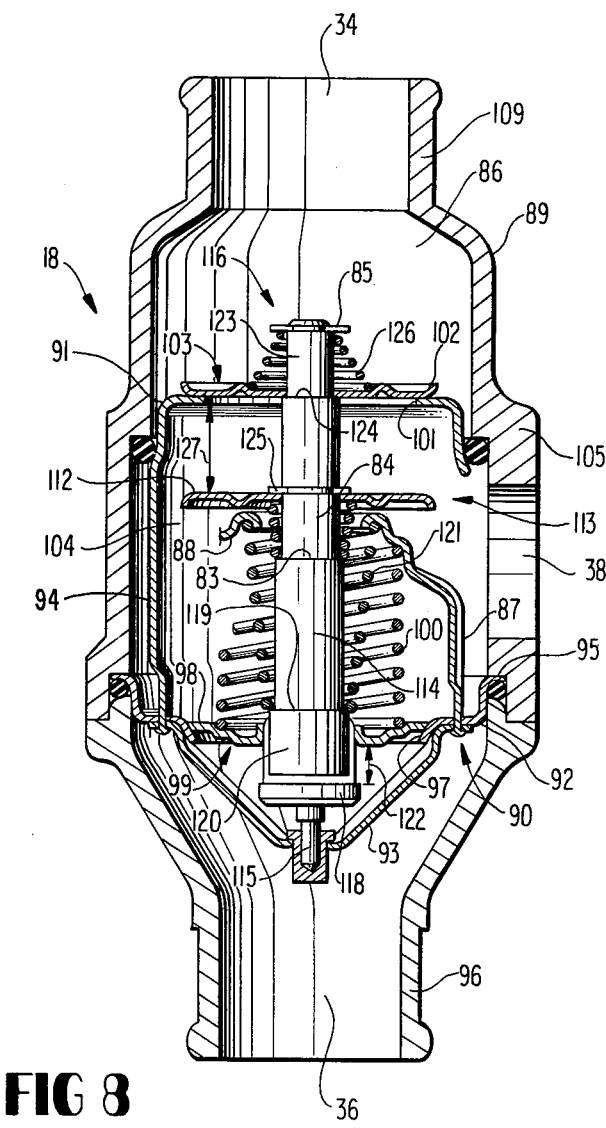
FIG 8

U.S. Patent  Apr. 8, 1980  Sheet 3 of 4  4,196,847
FIG 9
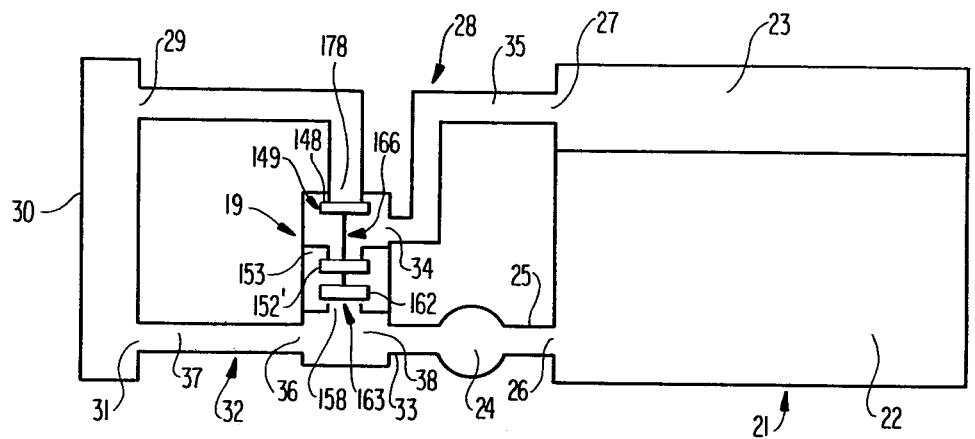
FIG 10
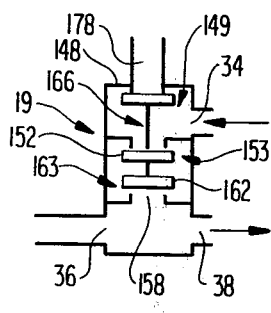
FIG 11
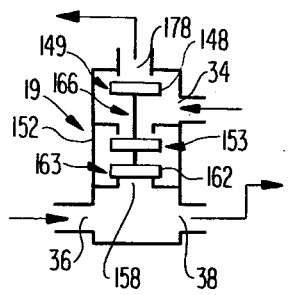
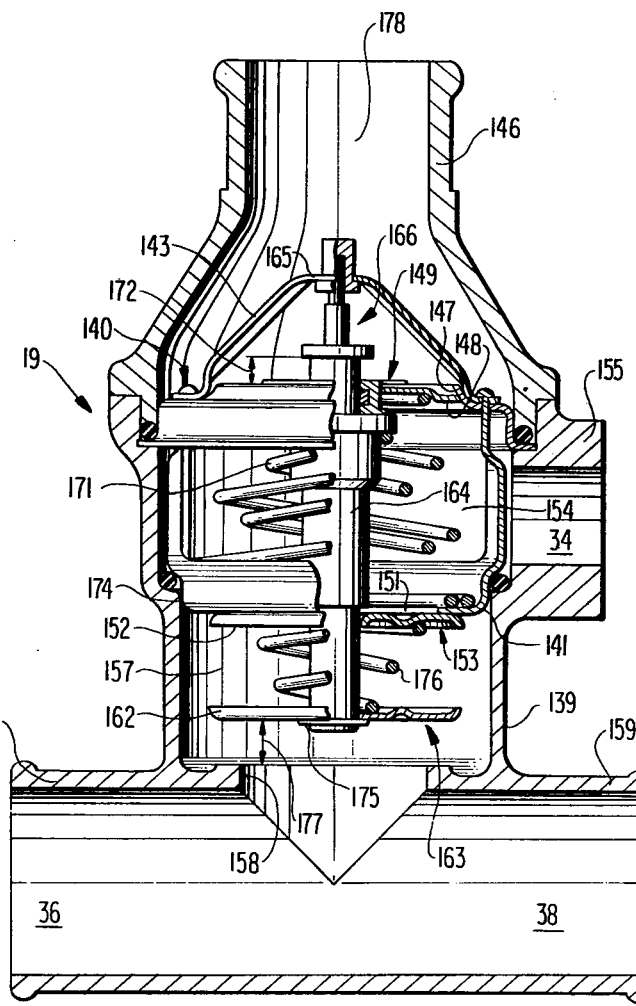
FIG 12

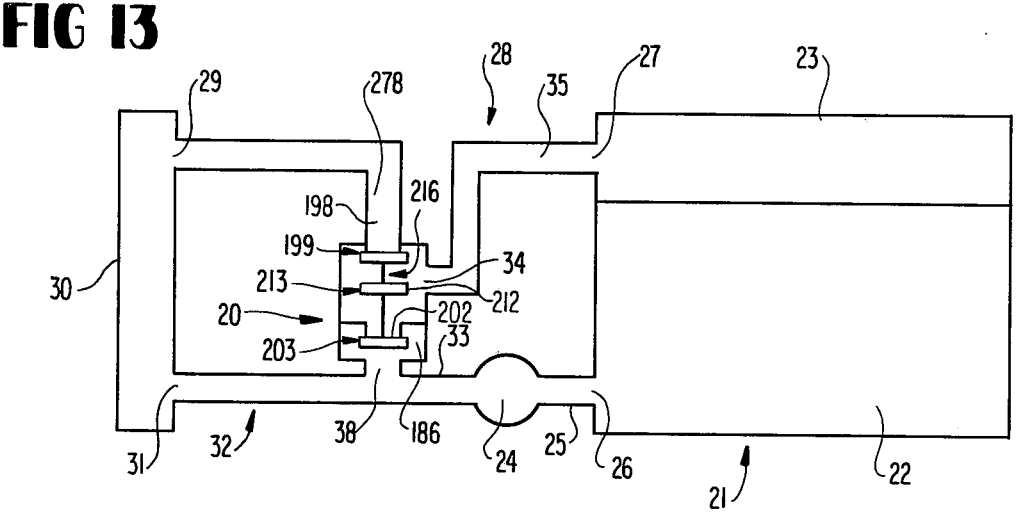
FIG 13
FIG 14
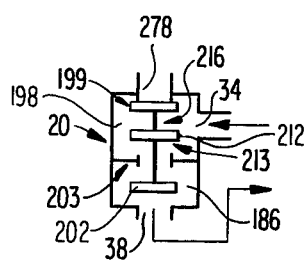
FIG 15
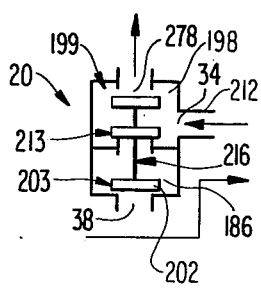
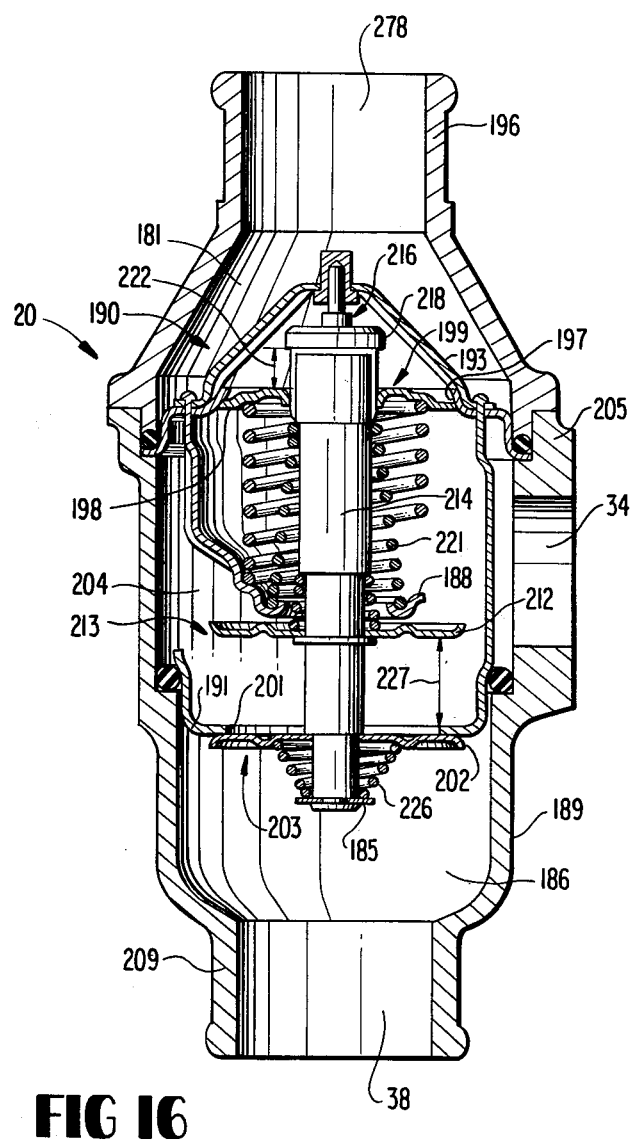
FIG 16

THERMOSTATIC CONTROL VALVE

The present invention relates to a control valve and, more particularly, to a thermostatic control valve for maintaining an essentially constant set value operating temperature of a liquid coolant which coolant is conductible through an internal combustion engine.

Thermostatic control valves have been proposed which include a warm-up valve for suppressing coolant flow at least in a partial area of the cooling jacket, a radiator valve for supplying coolant from the cooling jacket to the radiator to release heat from the liquid coolant, and a bypass valve for returning the liquid coolant emerging from the cooling jacket bypassing the radiator to a coolant inlet of the cooling jacket. The warm-up valve suppresses a flow of liquid coolant exclusively in a lower temperature or warm-up phase which phase extends down to a lower reference value of the operating temperature of the liquid coolant which temperature is below the set value operating temperature of the liquid coolant. Thermostatic regulating or adjusting elements, responsive to temperature changes and adapted to execute regulating movements, are provided for actuating the radiator valve and the bypass valve jointly in such a manner that, in a middle temperature phase or bypass phase extending down to the lower reference value and up to a middle reference value between the lower reference value and the set value, the radiator valve suppresses the coolant flow into the radiator and the bypass valve directs the liquid coolant emerging from the cooling jacket directly to the coolant inlet of the cooling jacket and in an upper temperature or control phase, adjoining the middle reference value and containing the set valve, the radiator valve permits the liquid coolant to flow into the radiator and the bypass valve reduces the volume of the liquid coolant fed directly to the coolant inlet of the cooling jacket as the temperature rises. The radiator valve is held by a spring with a pretensioning force which is adjusted to the middle reference value with the spring abutting a thrust bearing fixed immovably in the valve housing. The radiator valve is held in both the lower and middle temperature phases in a position which suppresses the flow of liquid coolant into the radiator.

A valve of the aforementioned type makes it possible to advantageously shorten a warm-up phase of the internal combustion engine which phase follows a cold start with the warm-up valve suppressing liquid coolant flowing in the cooling jacket until the coolant temperature reaches a lower reference value of, for example, 60° C. By virtue of such a thermostatic control valve arrangement, the emission of pollutants in the exhaust gas, which is known to be especially high in the warm-up phase of the internal combustion engine, is effectively reduced.

In Offenlegungsschrift No. 23 14 301, a control valve of the aforementioned type is proposed wherein an additional second thermostatic regulating element acts upon the warm-up valve. However, a disadvantage of this proposed thermostatic control valve construction resides in the fact that the additional second thermostatic regulating element increases the construction cost of the control valve.

The aim underlying the present invention essentially resides in providing a thermostatic control valve of the aforementioned type which minimizes the construction costs for valve actuation.

According to advantageous features of the present invention, a single thermostatic regulating means is provided which not only acts upon the radiator valve and bypass valve but also additionally actuates the warm-up valve. An additional thrust bearing is immovably mounted on the valve housing with a spring being arranged between the additional thrust bearing and the radiator valve which spring has a pretensioned force determined by a lower reference value and which spring is adapted to hold the warm-up valve means in a rest position in which position the warm-up valve suppresses the liquid coolant flow. The warm-up valve in the rest position has a predetermined play with respect to the radiator valve for permitting an actuation of the warm-up valve in the middle temperature phase.

By virtue of the features of the present invention, only a single thermostatic regulating or adjusting element need by provided which element is adapted to adjust the warm-up valve, the bypass valve, and the radiator valve so that both an additional regulating element for the warm-up valve and a fixed thrust bearing for the valve housing to accept the reaction forces need not be provided.

Moreover, according to the present invention, the bypass valve may be held by a spring in a lower and middle temperature phase in a position which allows direct coolant return from the coolant outlet of the coolant inlet of the cooling jacket and could be actuated in the control phase by a stop provided on the regulating or adjusting element. Consequently, in the lower temperature phase, the stop has a freedom of movement relative to the bypass valve thereby making it possible to actuate the warm-up valve independently of the middle temperature phase.

According to further advantageous features of the present invention, a valve closing element of the bypass valve is mounted on the thermostatic regulating or adjusting element with the bypass valve having an opening travel or path which is increased by at least the predetermined play of the warm-up valve. By providing a bypass valve construction having such features, the thermostatic control valve can advantageously be integrated in a premountable thermostat insert at least with its valve closing element.

In the control valve according to the present invention, the warm-up valve may be held in the position in which it suppresses coolant flow by spring means abutting a fixed thrust bearing on the valve housing and may cooperate in the middle temperature phase and in the control phase with a stop on the regulating or adjusting element.

In order to be able to premount the regulating or adjusting element and the valve closing element of the warm-up valve, according to additional advantageous features of the present invention, the valve closing element may be mounted on the thermostatic regulating or adjusting element.

To advantageously accommodate a complete integration of the warm-up valve in a premountable thermostat insert, according to the present invention, the thermostat insert is immovably mounted in the valve housing on which insert the valve seat and the thrust bearing of bearing of the spring means of the radiator valve as well as a thrust bearing for the regulating or adjusting element are mounted. The valve seat of the warm-up valve may also be mounted on the thermostat insert.

To compensate for installation and manufacturing tolerances in the thermostatic control valve of the present invention, the thermostatic regulating or adjusting element may be provided with a stop means for the actuation of the warm-up valve means into a position for suppressing the liquid coolant flow with additional spring means being interposed between the stop means and the valve closing element of the warm-up valve.

In proposed thermostatic control valves which include a valve inlet for connection to a coolant outlet of the cooling jacket, a valve inlet for connection to a coolant outlet of the radiator means, a valve outlet for connection to the coolant inlet of the cooling jacket, an intermedate chamber which is connectable by way of a valve controlled passageway with the valve outlet and the valve inlet associated with the cooling jacket, and the valve outlet connectable with the valve inlet associated with the radiator by a further passage controlled by the radiator valve, according to the present invention, the warm-up valve actuated by the additional thermostatic regulating or adjusting element, acts upon the passageway between the valve inlet corresponding or associated with the cooling jacket and the intermediate chamber. The regulating or adjusting element of this valve is therefore disposed in a chamber which connects the valve inlet with the passageway so that, in the warm-up phase, this element can come into contact in a heat transmitting manner by way of the valve inlet with the coolant which is warming up in the vicinity of the cooling jacket which is close to the combustion chambers in order to avoid an overheating phenomena which may result from a delayed response of the thermostatic control element. The proposed control valve is located adjacent the additional chamber for the above-mentioned previously explained outlet control of the regulating element acting upon the warm-up valve. In accordance with a first advantageous embodiment of a thermostatic control valve in accordance with the present invention, likewise operating with outlet control of the regulating element common to all three valves, a special chamber for the outlet side influence of the regulating element is eliminated by virtue of the fact that the warm-up valve operates on the passageway to connect the valve outlet with the intermediate chamber while the bypass valve acts upon the passageway to connect the valve inlet to the intermediate chamber.

In the first embodiment of the thermostatic control valve of the present invention, a further significant reduction of the structural length may be achieved by constructing the valve so that the spring means for manufacturing and installation tolerances of the warm-up valve abuts the stop for the position of the warm-up valve which suppresses the flow of coolant by way of the valve closing element of the bypass valve which element is movably guided on the regulating or adjusting element.

In accordance with another advantageous embodiment of a thermostatic control valve in accordance with the present invention, likewise operating with outlet control of the regulating or adjusting element which is common to all three valves, with the control valve, including a first valve inlet for connection to a coolant outlet of the cooling jacket, a second valve inlet for connection to the coolant outlet of the radiator, a valve outlet for connection to the coolant inlet of the cooling jacket, and a passageway controlled by the radiator valve adapted to connect the valve outlet to the second valve inlet, and with the valve outlet terminating in a valve chamber which can be disconnected from the bypass valve while the first valve inlet corresponding to the cooling jacket terminates in a further valve chamber adapted to be shut off from the warm-up valve, the valve chamber which is open to the valve outlet is connectable with the valve chambe which is open to the first valve inlet which corresponds or is associated with the cooling jacket by way of a passageway which is controlled at its respective ends by the bypass valve or by the warm-up valve. By virtue of this arrangement, the intermediate chamber required in heretofore proposed control valves is unnecessary and hence, the construction cost of the thermostatic control valve of the present invention can be relatively low.

In order to avoid a cold coolant shock from developing during outlet control upon the transition from the middle temperature phase or bypass phase to the control phase, in two additional advantageous embodiments of the control valve in accordance with the present invention, a so-called inlet control of the regulating or adjusting element which is common to the three valves is achieved by the fact that the first valve inlet is connectable with a valve chamber or passageway both by way of a passageway or central opening controlled by the radiator valve with an additional valve outlet for connection to the coolant inlet of the radiator and also by way of a passageway or central opening which is controlled by the warm-up valve and bypass valve and with the valve chamber being open to the valve outlet associated to the cooling jacket.

By virtue of the advantageous constructions of the last mentioned thermostatic control valves in accordance with the present invention, such valves then operate in such a manner that when the transition is made from the middle temperature phase to the control phase and the radiator is cut in, the regulating or adjusting element is influenced by a mixture of cooled coolant from the radiator and warmed coolant from the cooling jacket and, consequently, responds with smaller regulating movements.

An advantageous embodiment of the thermostatic control valve in accordance with the present invention, operation with an inlet control is achieved as well as a short structural length by the fact that the first valve inlet associated or corresponding to the cooling jacket is connectable by a passageway or central opening controlled by the warm-up valve and the valve chamber or connecting stub which is open to the valve outlet which corresponds to the cooling jacket is connectable with an intermediate chamber disposed between the valve chamber and the valve outlet by way of a passageway controlled by the bypass valve.

It is also possible to achieve a short structural length in accordance with the present invention by the fact that the spring means employed to compensate for manufacturing and installation tolerances of the warm-up valve abuts the stop to actuate the warm-up valve into the position in which the warm-up valve suppresses the coolant flow by way of the valve closing element of the bypass valve which is moveably guided on the regulating or adjusting element.

While the above-mentioned embodiment of the thermostatic control valve in accordance with the present invention provides for the arrangement of the warm-up and bypass valves in an intermediate chamber, in the second embodiment of the control valve of the present invention which operates with inlet control, it is advantageous if the valve chamber which is open to the valve outlet which corresponds or is associated with the cooling jacket is connectable with the first valve inlet which corresponds to the cooling jacket directly by way of a passageway or central opening which is controlled at one end by the warm-up valve and at the other end by the bypass valve.

Accordingly, it is an object of the present invention to provide a thermostatic control valve which avoids, by simple means, shortcomings and disadvantages encountered in the prior art.

Another object of the present invention is to provide a thermostatic control valve which is simple in construction and, therefore, inexpensive to manufacture.

A further object of the present invention resides in providing a thermostatic control valve which functions reliably under all operating conditions.

Yet another object of the present invention resides in providing a thermostatic control valve by which a warm-up valve, a bypass valve, and a radiator valve may be actuated by a single regulating or adjusting element.

A still further object of the present invention resides in providing a thermostatic control valve which may be advantageously integrated into a pre-mountable thermostatic insert.

Yet another object of the present invention resides in providing a thermostatic control valve which has a relatively short structural length.

Another object of the present invention resides in providing a thermostatic control valve which prevents the development of a cold coolant shock during a transition from a middle temperature phase to a control phase.

These and other objects, features, and advantages of the present invention will become more apparent from the following description when taken in connection with the accompanying drawings which show, for the purpose of illustration only, several embodiments in accordance with the present invention, and wherein:

FIG. 5 is a schematic representation of a coolant circuit of an internal combustion engine having a thermostatic control valve in accordance with a second embodiment of the present invention with the thermostatic control valve disposed in a first position;

FIG. 6 is a schematic representation of the thermostatic control valve of FIG. 1 in a second position;

FIG. 7 is a schematic representation of the thermostatic control valve of FIG. 5 in a third position;

FIG. 8 is a partially schematic cross-sectional view of the thermostatic control valve of FIG. 5;

FIG. 9 is a schematic representation of a coolant circuit of an internal combustion engine having a thermostatic control valve in accordance with a third embodiment of the present invention disposed therein with the thermostatic control valve being in a first position;

FIG. 10 is a schematic representation of the thermostatic control valve of FIG. 9 in a second position;

FIG. 11 is a schematic representation of the thermostatic control valve of FIG. 9 in a third position;

FIG. 12 is a schematic partial cross-sectional view of the thermostatic control valve of FIG. 9;

FIG. 13 is a schematic representation of a coolant circuit of an internal combustion engine having a thermostatic control valve in accordance with a fourth embodiment of the present invention disposed therein with the thermostatic control valve being disposed in a first position;

FIG. 14 is a schematic representation of the thermostatic control valve of FIG. 13 disposed in a second position;

FIG. 15 is a schematic representation of the thermostatic control valve of FIG. 13 disposed in a third position; and FIG. 16 is a partial cross-section schematic view of the thermostatic valve of FIG. 13.

Figure 1:
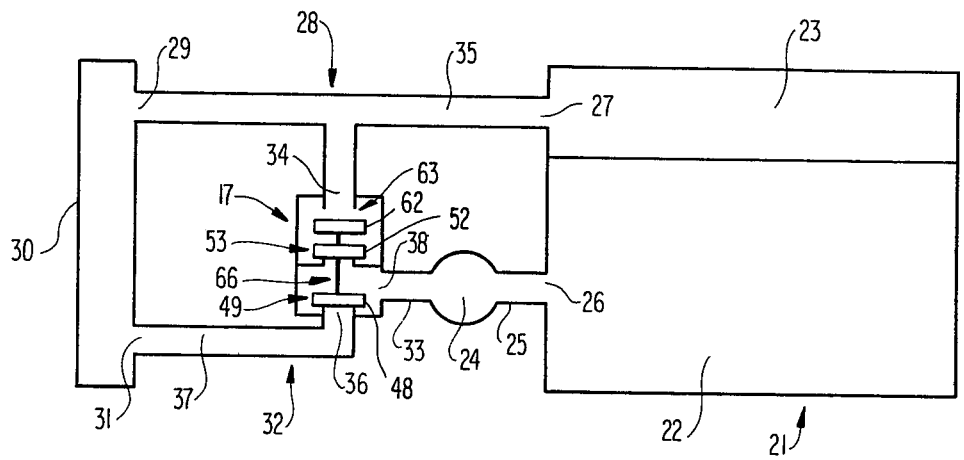
FIG. 1 is a schematic representation of a coolant circuit of an internal combustion engine having a thermostatic control valve in accordance with a first embodiment of the present invention with the thermostatic control valve being disposed in a first position.

Referring now to the drawings wherein like reference numerals are used throughout the various views to designate like parts and, more particularly, to FIGS. 1, 5, 9, and 13, according to these Figures, each of the coolant circuits have the following features in common:

An internal combustion engine generally designated by the reference numeral 21 is provided which includes a cooling jacket subdivided into a lower partial cooling area 22 and an upper partial cooling area 23 with the two partial cooling areas 22, 23 being connected to each other. A coolant pump 24, driven by the internal combustion engine 21, has a pressure side 25 connected to a coolant inlet 26 of the partial cooling area 22 of the cooling jacket.

The coolant is adapted to enter the coolant inlet 26 and flow through the partial cooling area 22 of the cooling jacket to the partial cooling area 23 so as to be discharged by way of a coolant outlet 27 located in the partial cooling area 23. A radiator feed line generally designated by the reference numeral 28 is provided for connecting the coolant outlet 27 to the radiator 30. For this purpose, the radiator feed line 28 is guided to a coolant inlet 29 of the radiator 30 with the radiator 30 serving to release heat from the liquid coolant. The radiator includes a coolant outlet 31 connected to a radiator return line generally designated by the reference numeral 32 which, in turn, is adapted to be connected to a suction side 33 of the coolant pump 24.

A control valve generally designated by the reference numerals 17, 18, 19, or 20, is provided in the coolant circuits for connecting the radiator feed line 28 and the radiator return line 32 in such a manner that a valve inlet 34 of the respective thermostatic control valves 17, 18, 19, or 20 is connected by way of a segment or portion 35 of the radiator feed line 28 to the coolant outlet 27; another valve inlet 36 is connected, by way of a segment or portion 37 of the radiator line 32 to the coolant outlet 31; and valve outlet 38 is connected to the suction side 33 of the coolant pump 24.

Figure 4:
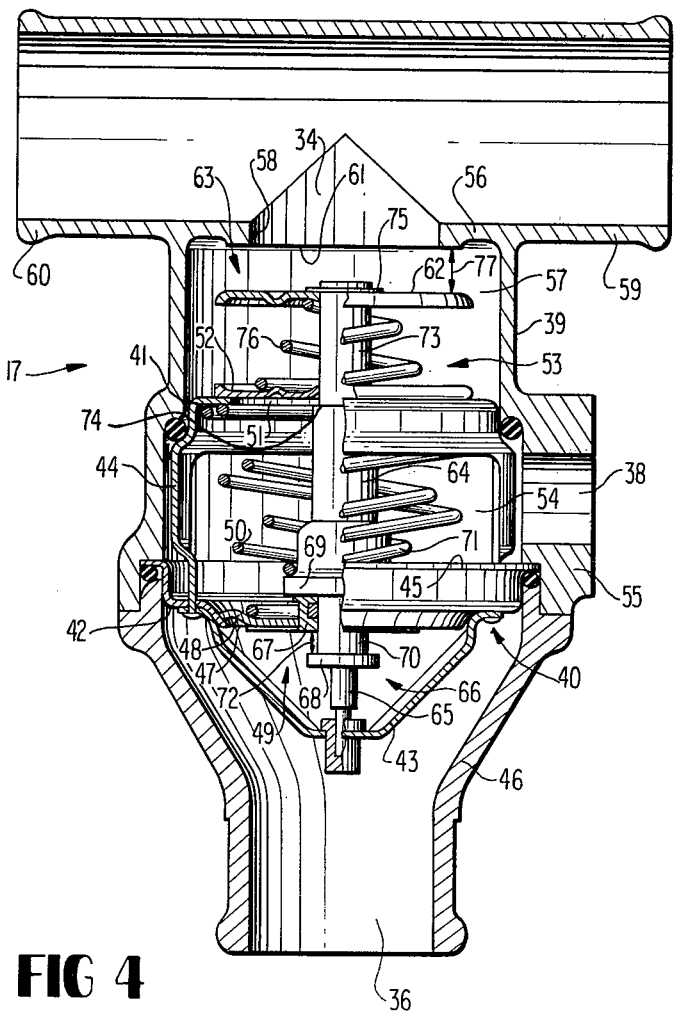
FIG. 4 is a partially schematic cross-sectional view of the thermostatic control valve of FIG. 1.

As shown in FIGS. 1–4, and most clearly in FIG. 4, the thermostatic control valve 17 has a pre-mounted thermostat insert generally designated by the reference numeral 40 mounted inside a cylindrical valve housing 39 with the thermostat insert 40 including two annular valve seat plates 41, 42, an arcuate thrust bearing 43, and spacers 44 adapted to hold valve seat plate 41 and thrust bearing 43 in an immovable position against valve seat plate 42. An outer edge 45 of the valve seat plate 42 is tensioned immovably against valve housing 39 by a cover-like connecting stub 46. A valve plate 48 cooperates with a central opening 47 of valve seat plate 42 with the opening 47 and valve plate 48 forming a radiator valve generally designated by the reference numeral 49.

The connecting stub 46, which forms a valve inlet 36, is, as shown in FIG. 1, connected with the coolant outlet 31 of the radiator 30 by way of a radiator line portion 37 of the radiator return line 32. The valve plate 48 is held in the closed position illustrated in FIGS. 1, 2, and 4, by a wide conical spring 50 which abuts the other valve seat plate 41. In the closed position of the valve plate 48, the liquid coolant flow in the radiator 30 is suppressed. A valve plate 52 cooperates with a central opening 51 of valve seat plate 41 with the valve plate 52 and the opening 51 forming a warm-up valve generally designated by the reference numeral 53. The radiator valve 49 and warm-up valve 53 enclose a valve chamber 54 between them with the valve chamber 54 being open or communicating with a connecting stub 55 of valve housing 39 which forms the valve outlet 38.

A partition 56 is provided in the valve housing 39 and is located opposite the connecting stub 46 so that an intermediate chamber 57 is enclosed between the partition 56 and the warm-up valve 53. The intermediate chamber 57 is connected by way of a passageway 58 in the partition 56 with two connecting stubs 59 and 60 which are open to one another. The passageway 58 forms the valve inlet 34.

In the construction of FIG. 1, the connecting stub 59 is adapted to be connected by way of segment or portion 35 of the radiator feed line 28 with coolant outlet 27 with the connecting stub 60 being adapted to be connected with the coolant inlet 29 of the radiator 30. The passageway 58 terminates in an end surface 61 in the intermediate chamber 57. A valve plate 62 cooperates with the end surface 61 so as to form a bypass valve 35 generally designated by the reference numeral 63.

A thermostatic adjusting or regulating element generally designated by the reference numeral 66 is provided for effecting a joint temperature-dependent actuation of the radiator valve 49, warm-up valve 53, and bypass valve 63. The thermostatic adjusting element 66 includes a cylinder 64, filled with an expandable material, and a piston rod having an outer end 65 which is immovably attached to a thrust bearing 43. The piston rod is subjected to an action of the expandable material in the cylinder 64 so as to work as a plunger. The cooperation between the cylinder 64 and piston rod of the thermostatic adjusting element 66 with the valve plates 48, 52, and 62 is as follows:

The valve plate 48 is mounted on a central stuffing box 67 which is axially displaceably guided in a fluid-type manner on a narrowed segment 70 of cylinder 64 delimited by two bead-like stops 68, 69. The stop 68 functions to open the valve plate 48, illustrated in a rest position in FIG. 4, in which position the valve plate 48 is retained by a narrow conical spring 71 abutting at one end the valve seat plate 41 and the stop 69 at the other end. The stop 68 has a predetermined travel or play 72 with respect to the valve plate 48 so as to allow independent actuation of the valve plate 52 of warm-up valve 53 in a middle temperature phase or range shown in FIG. 2.

A narrowed section 73 is provided on the cylinder 64 at an end thereof which is opposite the narrowed segment 70. The two valve plates 52 and 62 are displaceably guided on the narrowed section 73, delimited by two stops 74, 75, with a conical spring 76, supported between valve plates 52 and 62, serving to compensate for installation and manufacturing tolerances. The stop 74 actuates valve plate 52 directly and actuates valve plate 62 by way of the valve plate 52 and the conical spring 76.

Valve plate 62 or valve seat plate 41 or both valve plate 52 and valve seat plate 41 can be provided with one or more bypass bores in order to subject cylinder 64 of the thermostatic adjusting element 66, in a lower temperature phase, to a control flow of the liquid coolant from the partial cooling area 23 in the event a heat transfer from the partial cooling area 23 to the cylinder 64 proceeds too slowly because of structurally imposed distances.

Figure 2:
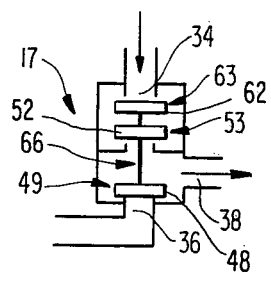
FIG. 2 is a schematic representation of a second position of the thermostatic control valve of FIG. 1.
Figure 3:
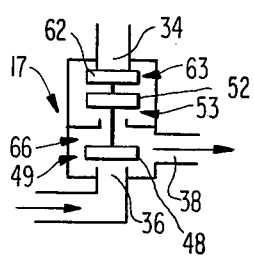
FIG. 3 is a schematic representation of a third position of the thermostatic control valve of the present invention.

The bypass valve 63 has an opening travel or play 77 in a rest or normal position of the cylinder 64 which travel 77 is increased so that, as shown in FIG. 2, both valves 53 and 63 are open when play 72 has been reduced to 0.

As shown in FIGS. 5–8 and, most clearly in FIG. 8, the thermostatic control valve 18 has a pre-mounted thermostat insert generally designated by the reference numeral 90 mounted inside a cylindrical valve housing 89 with the thermostat insert 90 including two annular valve seat plates 91 and 92, an arcuate thrust bearing 93, as well as spacers 94 adapted to hold valve seat plate 91 together with thrust bearing 93 in an immovable position against the valve seat plate 92. An outer edge 95 of valve seat plate 92 is tensioned immovably against valve housing 89 by a cover-like connecting stub 96. A valve plate 98 cooperates with a central opening 97 of valve seat plate 92 with the valve plate 98 and central opening 97 forming a radiator valve generally designated by the reference numeral 99. The connecting stub 96, which forms the valve inlet 36, is, as shown in FIG. 5, connected with the coolant outlet 31 of the radiator 30 by way of the radiator line portion 37 of the radiator return line 32. Valve plate 98 is held in the closed position, illustrated in FIGS. 5, 6 and 8, by a wide helical spring 100 which abuts an annular spring plate 88. In the closed position of the valve plate 98, the liquid coolant flow in the radiator 30 is suppressed. The spring plate 88 is held against valve seat plate 92 together with thrust bearing 93 by additional spacers 87. A valve plate 102 cooperates with a central opening 101 of valve seat plate 91 with the opening 100 and valve plate 102 forming a warm-up valve generally designated by the reference numeral 103. The radiator valve 99 and warm-up valve 103 enclose a valve chamber 104 between them with the valve chamber 104 communicating with a connecting stub 105 of valve housing 89 which forms the valve outlet 38.

A connecting stub 109 of valve housing 89, located opposite connecting stub 96, forms the valve inlet 34 which, since as shown in FIG. 5, the connecting stub 109 is connected with the radiator feed line 28, is connected with the coolant outlet 27 by way of the segment or portion 35 of the radiator feed line 28. The central opening 101 of the valve seat plate 91 forms a direct passageway between valve chamber 104 and a valve chamber 86 which is open to the valve inlet 34. Furthermore, a central opening 101, together with a third valve plate 112, forms a bypass valve generally designated by the reference numeral 113.

A thermostatic regulating or adjusting element generally designated by the reference numeral 116 is provided for joint temperature-dependent actuation of the radiator valve 99, warm-up valve 103 and bypass valve 113. As with the adjusting element 66, the thermostatic adjusting element 116 includes a cylinder 114, filled with an expandable material, and a piston rod having an outer end 115 immovably attached to a thrust bearing 93. The piston rod is subjected to an action of the expandable material in the cylinder 114 so as to work as a plunger. The cooperation between the cylinder 114 of the thermostatic adjusting element 116 with the valve plates 98, 102, and 115 is as follows:

The valve plate 98 is guided in an axially sliding and liquid-tight manner on a segment 120 of the cylinder 114 which segment 120 has an increased diameter. A bead-like stop 118 is provided on the cylinder 114 and functions to open the valve 98, illustrated in a rest position in FIG. 8, in which position the valve plate 98 is held by a conical spring 121 which abuts an additional stop 119 on cylinder 114 and spring plate 88. The bead-like stop 118 has a play 122 with respect to valve plate 98 in order to allow independent actuation of valve plate 102 of the warm-up valve 103 in the middle temperature phase or range shown in FIG. 6.

The valve plate 102 is guided in an axially sliding and liquid-tight fashion between two stops 124 and 85 on an additional segment 123 provided at one end of the cylinder 114 opposite the segment 120. A conical spring 126 is provided for compensating for installation and manufacturing tolerances. The conical spring 126 abuts the valve plate 102 and stop 85 and holds the valve plate 102 in a closed position illustrated in FIGS. 5 and 8 and abuts at a stop 85 which serves to close the warm-up valve 103.

The valve plate 112 is guided in an axially sliding and liquid-tight manner between two stops 83 and 125 provided on a central section 84 of the cylinder 114. A conical spring 82, which serves to compensate for installation and manufacturing tolerances, is tensioned between stop 83 and valve plate 112, with the stop 83 serving for actuation of the bypass valve 113 into the closed position illustrated in FIG. 7. The bypass valve 113 has an increased opening travel or play 127 in the rest position of cylinder 114 such that, as shown in FIG. 6, warm-up valve 103 and bypass valve 113 are opened when the play 122 is reduced to 0. As with the thermostatic bores 17, bypass control valves may also be provided in the valve plate 102 of the warm-up valve 103.

The constructional features of the thermostatic valve 19 illustrated in FIGS. 9-12 are essentially identical to that of the thermostatic control valve 17. This thermostatic control valve 19 differs from the thermostatic control valve 17 only in having a different arrangement of a warm-up valve generally designated by the reference numeral 153, a radiator valve generally designated by the reference numeral 149, and a bypass valve generally designated by the reference numeral 163 in the cooling circuit of the internal combustion engine 21. Consequently, in the following description, the thermostatic valve 19 is described with reference numerals which have been increased by the number 100 over the corresponding reference numerals of the thermostatic control valve 17 to designate the features and/or positions which correspond to those shown in connection with the thermostatic control valve 17.

As shown most clearly in FIG. 12, a connecting stub 155 of valve housing 139, forming the valve inlet 34, communicates both with the coolant outlet 27 of cooling jacket and with the valve chamber 154, while a connecting stub 146, which can be disconnected from a valve chamber 154 by the radiator valve 149, forms an additional valve outlet 178 which is open to the coolant inlet 29 of the radiator 30. The valve housing 139 includes two interconnected flush connecting stubs 159, 160 with the stub 159 forming the valve outlet 38, connected with coolant inlet 26 of the cooling jacket, and the stub 160 forming the valve inlet 36 connected with the coolant outlet 31 of the radiator 30. A passageway 158, which connects the connecting stubs 159 and 160 with an intermediate chamber 157 of the valve housing 139, may be blocked by the bypass valve 163. The warm-up valve 153 controls the connection of the valve chamber 154 to the intermediate chamber 157. The valve plates 148, 152, and 162 of the radiator valve 149, warm-up valve 153, and bypass valve 163 are actuated by a cylinder 164 of a thermostatic regulating element generally designated by the reference numeral 166 in the same manner described hereinabove in connection with the thermostatic control valve 17. An outer end 165 of the piston rod is adapted to be acted upon by the expandable material contained in the cylinder 164. The piston rod abuts a thrust bearing 143 of a thermostatic insert generally designated by the reference numeral 140 disposed in a fixed manner in the valve housing 139. In all other structural features, the thermostatic control valve 19 of FIGS. 9-12 is essentially identical in structural features to that of the thermostatic control valve 17.

The thermostatic control valve 20 illustrated in FIGS. 13-16 is essentially identical in structural features to thermostatic control valve 18, the control valve 20 differing from the thermostatic control valve 18 only in the arrangement of a warm-up valve generally designated by the reference numeral 203, a bypass valve generally designated by the reference numeral 213, and a radiator valve generally designated by the reference numeral 199 in the coolant circuit of the internal combustion engine 21. Consequently, the reference numerals used in the following description in connection with the thermostatic control valve 20 for the features and/or positions corresponding to the thermostatic control valve 18 have been increased by 100 for such features and/or positions of the thermostatic control valve 20.

Within a cylindrical valve housing 189, the warm-up valve 203 and the radiator valve 199 delimit a central valve chamber 204 from two adjacent outer valve chambers 186 and 181. Bypass valve 213 acts upon an end of a central opening 201 of valve seat plate 191 of a thermostat insert generally designated by the reference numeral 190 which is opposite the warm-up valve 203. In the rest position of the cylinder 214 of a thermostatic regulating or adjusting element generally designated by the reference numeral 216, which actuates the radiator valve 199, warm-up valve 203, and bypass valve 213, illustrated in FIGS. 13 and 16, a bead-like stop 118, which actuates the radiator valve 199, has a play 222 with respect to the valve plate 198 of the radiator valve 199. The valve plate 212 of bypass valve 213 has an increased opening travel or play 227 with respect to valve seat plate 191. The opening travel or play 227 is so large that both the warm-up valve 203 and the bypass valve 213 are open when the cylinder 214 is brought into the position illustrated in FIG. 14 with respect to the thrust bearing 193 in which the play 222 has been reduced to 0.

As shown in FIG. 13, one outer valve chamber 186 is open to the radiator return line 32 and hence to the suction side 33 of the coolant pump 24 by way of a connecting stub 209 which forms a valve outlet 38. It is also evident that the central valve chamber 204 is connected by way of a connecting stub 205, which forms valve inlet 34, to the segment 35 of the radiator feed line 28 which is connected to the coolant outlet 27. Finally, as also shown in FIG. 13, a cover-like connecting stub 196 which delimits valve chamber 181, forms an additional valve outlet 278 which is connected by way of the remaining segment of the radiator feed line 28 to the coolant inlet 29 of the radiator 30. The remaining features of the thermostatic control valve 20 corresponds to the features described hereinabove in connection with the thermostatic control valve 18.

The four thermostatic control valves, 17, 18, 19, and 20, operate as follows:

Lowered Temperature Phase (Warm-up Phase):

In this temperature phase, which extends up to a lower reference value of, for example, 60° C. of the coolant temperature in the vicinity of the coolant outlet 27, the corresponding thermostatic regulating or adjusting elements 66, 116, 166, or 216 is in its rest position so that the respective thermostatic control elements 17, 18, 19, or 20 of the cooling circuit (FIGS. 1, 5, 9, 13), are in the warm-up position in which the bypass valve 63, 113, 163, or 213 is indeed open but the radiator valves 49, 99, 149 or 199, as well as the warm-up valves 53, 103, 153, or 203 are closed. Closure of the corresponding radiator valve 49, 99, 149, or 199 disconnects the radiator 30 from the cooling circuit while the closed position of the corresponding warm-up valve 53, 123, 153, or 203 suppresses the flow of coolant in the partial cooling areas 22, 23 of the cooling jacket with the possible exception of a small control flow to flow over the thermostatic regulating element of the respective thermostatic control valves 17, 18, 19, or 20.

Middle Temperature Phase (Bypass Phase):

In this temperature phase, which extends down to the lower reference value and up to a middle reference value which corresponds to the opening temperature of the radiator valve such as, for example, 78° C., the four thermostatic control valve 17, 18, 19, or 20 assume a bypass position shown in FIGS. 2, 6, 10 and 14, respectively. In the bypass position, the radiator 30, because the radiator valve 49, 99, 149, or 199 is still closed, continues to be disconnected but both the warm-up valve 53, 103, 153, or 203 and bypass valve 63, 113, 163, 213 and 63/103 and 113/153 and 163/203 and 213 are open whereby in all four thermostatic control valves 17, 18, 19, or 20, the coolant outlet 27 of the cooling jacket is bypassed to the suction side 33 of the coolant pump and hence to the coolant inlet 26 of the cooling jacket.

Upper Temperature Phase (Control Phase):

In this temperature phase, which adjoins the middle reference value and contains the set value to be maintained, all three valves, namely, the warm-up valve, radiator valve, and bypass valve are initially opened, whereby the radiator 30 in the coolant circuit is connected by open radiator valve 49, 99, 149 or 199, and a mixture of hot coolant from the coolant outlet 27 and cooler coolant from the coolant outlet 31 is fed to the coolant inlet 26 of the cooling jacket so as to provide for a mixed phase operation.

When the coolant temperature in the vicinity of the coolant outlet 27 of the cooling jacket has reached the closing temperature of the corresponding bypass valves 63, 113, 163, 213, the four thermostatic control valves 17, 18, 19, 20 are in the radiator phase position illustrated respectively in FIGS. 3, 7, 11, and 15. This position differing from the position in the mixed phase in that the corresponding bypass valve is closed and the total amount of coolant emerging from the coolant outlet 27 of the cooling jacket is sent through the radiator 30 so as to result in a radiator phase.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein but intend to cover all such modifications as are encompassed by the scope of the appended claims.

I claim:

1. A thermostatic control valve for maintaining an essentially constant set value of an operating temperature of a liquid coolant conductible through a cooling jacket of an internal combustion engine, the thermostatic control valve including a warm-up valve means for suppressing coolant flow at least in a partial area of the cooling jacket, a radiator valve means for supplying coolant emerging from a coolant outlet of the cooling jacket to a radiator means for dissipating heat from the liquid coolant, and a bypass valve means for returning the liquid coolant emerging from the cooling jacket bypassing the radiator means to a coolant inlet of the cooling jacket, the warm-up valve means being adapted to suppress a flow of the liquid coolant exclusively in a lower temperature phase which phase extends down to a lower reference value of the operating temperature of the liquid coolant which temperature is below the set value, a single thermostatic regulating means responsive to temperature changes and adapted to execute regulating movements for actuating the radiator valve means and the bypass valve means jointly in such a manner that, in a middle temperature phase extending down to the lower reference value of the operating temperature and up to a middle reference value between the lower reference value of the operating temperature and the set value, the radiator valve means suppresses the coolant flow into the radiator means and the bypass valve means directs liquid coolant emerging from the coolant outlet of the cooling jacket directly to the coolant inlet of the cooling jacket, and, in an upper temperature phase adjoining the middle reference value and containing the set value, the radiator valve means permits the liquid coolant to flow into the radiator means and the bypass valve means reduces the volume of liquid coolant fed directly to the coolant inlet of the cooling jacket as the temperature of the coolant rises, and wherein the radiator valve means is held by a spring means with a pretensioning force which is adjusted to the middle reference value, the spring means abutting a thrust bearing means fixed immovably to a valve housing, the radiator valve means being held in both the lower and middle temperature phases in a position which suppresses the flow of liquid coolant into the radiator means, characterized in that means are provided on the thermostatic regulating means for actuating the warm-up valve means, an additional thrust bearing means is immovably mounted on the valve housing, a further spring means is arranged between said additional thrust bearing means and the warm-up valve means, the further spring means has a pretensioned force determined by the lower reference value and is adapted to hold the warm-up valve means in a rest position in which the warm-up valve means suppresses the liquid coolant flow, the thermostatic regulating means in the rest position has a predetermined play for permitting an actuation of the warm-up valve means in the middle temperature phase.

2. A thermostatic control valve according to claim 1, characterized in that the bypass valve means includes a valve closing member mounted on the thermostatic regulating means, and in that the bypass valve means has an opening travel path which is increased at least by the predetermined play of the thermostatic regulating means.

3. A thermostatic control valve according to claim 2, characterized in that the warm-up valve means includes a valve closing member mounted on the thermostatic regulating means.

4. A thermostatic control valve according to claim 3, characterized in that a thermostat insert means is immovably mounted in the valve housing, the thrust bearing means and additional thrust bearing means are mounted on said thermostat insert means, and in that the warm-up valve means includes a valve seat mounted on the thermostat insert means.

5. A thermostatic control valve according to claim 4, characterized in that the thermostatic regulating means is provided with a stop means adapted to actuate the warm-up valve means into a position for suppressing the liquid coolant flow, and additional spring means interposed between the stop means and valve closing element of the warm-up valve means for compensating for installation and manufacturing tolerances.

6. A thermostatic control valve according to claim 5, with a first valve inlet means adapted to be connected to the coolant outlet of the cooling jacket, a second valve inlet means adapted to be connected to the coolant outlet of the radiator means, a valve outlet means adapted to be connected to the coolant inlet of the cooling jacket, an intermediate chamber adapted to be connected by a valve-controlled passageway with the valve outlet means and with the first valve inlet means, and wherein the valve outlet means is adapted to be connected with the second valve inlet means by a further passageway controlled by the radiator valve means, characterized in that the warm-up valve means controls the further passageway so as to connect the valve outlet with the intermediate chamber, and in that the bypass valve means controls a passageway so as to connect the first valve inlet means to the intermediate chamber.

7. A thermostatic control valve according to claim 6, characterized in that the valve closing member of the bypass valve means is movably mounted on the thermostatic regulating means, and in that the additional spring means urges the valve closing member of the bypass valve means against the stop means.

8. A thermostatic control valve according to one of claims 1, 2, 3, 4, or 5, with a first valve inlet means adapted to be connected to the coolant outlet of the cooling jacket, a second valve inlet means adapted to be connected to the coolant outlet of the radiator means, a valve outlet means adapted to be connected to the coolant inlet of the cooling jacket, a passageway controlled by the radiator valve means adapted to connect the valve outlet means to the second valve inlet means, the valve outlet means terminating in a valve chamber adapted to be disconnected from the bypass valve means, and the first valve inlet means terminating in a further valve chamber adapted to be shut off from the warm-up valve means, characterized in that an additional passageway is adapted to connect the valve chamber with the further valve chamber, and in that at least one of the bypass valve means and the warm-up valve means control respective ends of said additional passageway.

9. A thermostatic control valve according to one of claims 1, 2, 3, 4, or 5, with a first valve inlet means adapted to be connected to a coolant outlet of the cooling jacket, a second valve inlet means adapted to be connected to the coolant outlet of the radiator means, a valve outlet means adapted to be connected to the coolant inlet of the cooling jacket, characterized in that the first valve inlet means is adapted to be connected with a valve chamber disposed between the first valve inlet means and the valve outlet means both by way of a passageway controlled by the radiator valve means and an additional valve outlet means adapted to be connected to the coolant inlet, and also by an additional passageway controlled by the warm-up valve means and the bypass valve means, the valve chamber being open to the valve outlet means coordinated to the coolant inlet of the cooling jacket.

10. A thermostatic control valve according to claim 9, characterized in that an intermediate chamber is disposed between the valve chamber and the valve outlet means, the additional passageway connecting the intermediate chamber with the valve outlet means.

11. A thermostatic control valve according to claim 10, characterized in that the valve closing member of the bypass valve means is movably mounted on the thermostatic regulating means, and in that the additional spring means urges the valve closing member of the bypass valve means against the stop means.

12. A thermostatic control valve according to claim 9, characterized in that the valve chamber is adapted to be connected with the first valve inlet means directly by the additional passageway, and in that the warm-up valve means and the bypass valve means control respective ends of the additional passageway.

13. A thermostatic control valve according to claim 1, characterized in that the warm-up valve means includes a valve closing member mounted on the thermostatic regulating means.

14. A thermostatic control valve according to claim 1, characterized in that a thermostat insert means is immovably mounted in the valve housing, the thrust bearing means and additional thrust bearing means are mounted on said thermostat insert means, and in that the warm-up valve means includes a valve seat mounted on the thermostat insert means.

15. A thermostatic control valve according to claim 1, characterized in that the thermostatic regulating means is provided with a stop means adapted to actuate the warm-up valve means into a position for suppressing the liquid coolant flow, and additional spring means interposed between the stop means and valve closing element of the warm-up valve means for compensating for installation and manufacturing tolerances.

16. A thermostatic control valve according to claim 1, with a first valve inlet means adapted to be connected to the coolant outlet of the cooling jacket, a second valve inlet means adapted to be connected to the coolant outlet of the radiator means, a valve outlet means adapted to be connected to the coolant inlet of the cooling jacket, an intermediate chamber adapted to be connected by a valve-controlled passageway with the valve outlet means and with the first valve inlet means, and wherein the valve outlet means is adapted to be connected with the second valve inlet means by a further passageway controlled by the radiator valve means, characterized in that the warm-up valve means controls the further passageway so as to connect the valve outlet with the intermediate chamber, and in that the bypass valve means controls a passageway so as to connect the first valve inlet means to the intermediate chamber.

17. A thermostatic control valve according to claim 1, wherein said thrust bearing means and said additional thrust bearing means are formed by respective portions of a single thrust member immovably mounted on the valve housing.

* * * * *